United States Patent
Ho et al.

(10) Patent No.: US 9,179,403 B2
(45) Date of Patent: Nov. 3, 2015

(54) MACROCELL BASE STATION, A TELECOMMUNICATIONS NETWORK, AND A FEMTOCELL BASE STATION, AND A METHOD OF SWITCHING A FEMTOCELL BASE STATION BETWEEN A DORMANT MODE AND AN ACTIVE MODE

(75) Inventors: Lester Tse We Ho, Dublin (IE); Imran Ashraf, Wiltshire (GB)

(73) Assignee: Alcatel Lucent, Boulogne-Billancourt (FR)

(*) Notice: Subject to any disclaimer, the term of this patent is extended or adjusted under 35 U.S.C. 154(b) by 64 days.

(21) Appl. No.: 13/825,480

(22) PCT Filed: Aug. 4, 2011

(86) PCT No.: PCT/EP2011/003905
§ 371 (c)(1),
(2), (4) Date: Jun. 6, 2013

(87) PCT Pub. No.: WO2012/037999
PCT Pub. Date: Mar. 29, 2012

(65) Prior Publication Data
US 2013/0244736 A1    Sep. 19, 2013

(30) Foreign Application Priority Data
Sep. 21, 2010    (EP) .................................... 10290496

(51) Int. Cl.
*H04W 36/00* (2009.01)
*H04W 52/02* (2009.01)
(Continued)

(52) U.S. Cl.
CPC ...... *H04W 52/0209* (2013.01); *H04W 52/0206* (2013.01); *H04W 52/0251* (2013.01); *H04W 16/32* (2013.01); *H04W 84/045* (2013.01)

(58) Field of Classification Search
CPC .......... H04W 84/045; H04W 36/0016; H04W 36/04
USPC ........ 455/456.1, 456.6, 422.1, 444, 442, 440, 455/436, 439
See application file for complete search history.

(56) References Cited

U.S. PATENT DOCUMENTS 8,326,304 B2 * 12/2012 Kim et al. ...................... 455/443
8,520,634 B2 * 8/2013 Wu ................................. 370/328
(Continued)

FOREIGN PATENT DOCUMENTS

JP    2009-232277 A    10/2009
WO    2009120809 A2    10/2009
(Continued)

OTHER PUBLICATIONS

CMCC, "Summary of HeNB interference management methods based on different interference scenarios," $3^{rd}$ Generation Partnership Project (3GPP), 3GPP TSG-RAN WG4 Meeting #52bis, R4-093611, XP050393223, pp. 1-7, Oct. 12, 2009.
(Continued)

*Primary Examiner* — Sonny Trinh
(74) *Attorney, Agent, or Firm* — Fay Sharpe LLP

(57) ABSTRACT

A method is provided of switching a femtocell base station for wireless telecommunications between a dormant mode and an active mode. The femtocell base station lies within the coverage area of a macrocell base station. The macrocell base station determines whether a user terminal authorized to connect with the femtocell base station is within the coverage area of the femtocell base station, and dependent upon said determination the macrocell base station transmitting over air to the femtocell base station a command for the femtocell base station to switch mode.

20 Claims, 3 Drawing Sheets

(51) Int. Cl.
*H04W 16/32* (2009.01)
*H04W 84/04* (2009.01)

(56) References Cited

U.S. PATENT DOCUMENTS

| | | | |
|---|---|---|---|
| 8,630,650 B2 * | 1/2014 | Lee | 455/444 |
| 8,688,133 B2 * | 4/2014 | Maeder et al. | 455/449 |
| 2009/0285143 A1 | 11/2009 | Kwun et al. | |
| 2010/0056184 A1 | 3/2010 | Vakil et al. | |
| 2011/0077043 A1 | 3/2011 | Aoyagi et al. | |
| 2013/0225179 A1 * | 8/2013 | Jul et al. | 455/438 |

FOREIGN PATENT DOCUMENTS

| | | |
|---|---|---|
| WO | 2010009162 A1 | 1/2010 |
| WO | 2010078273 A2 | 7/2010 |
| WO | WO 2010/104295 A2 | 9/2010 |

OTHER PUBLICATIONS

International Search Report for PCT/EP2011/003905 dated Dec. 29, 2011.

R1-092120, Regulatory Issues of eNB-to-RN Backhauling in UL Resource; LG Electronics; 3GPP TSG RAN WG1 Meeting #57, San Francisco, USA, May 4-8, 2009, 5 pp.

PCT Pat. App. No. PCT/EP2011/003905, Written Opinion of the International Seraching Authority, mailed Dec. 29, 2011, 6 pp.

European Pat. App. No. 10290496.8, Extended European Search Report, mailed Mar. 9, 2011, 7 pp.

English Bibliography for Japanese Patent Application Publication No. JP2009232277A, published Oct. 8, 2009, printed from Thomson Innovation on May 27, 2015, 4 pp.

* cited by examiner

ALTERNATIVE PROPOSAL

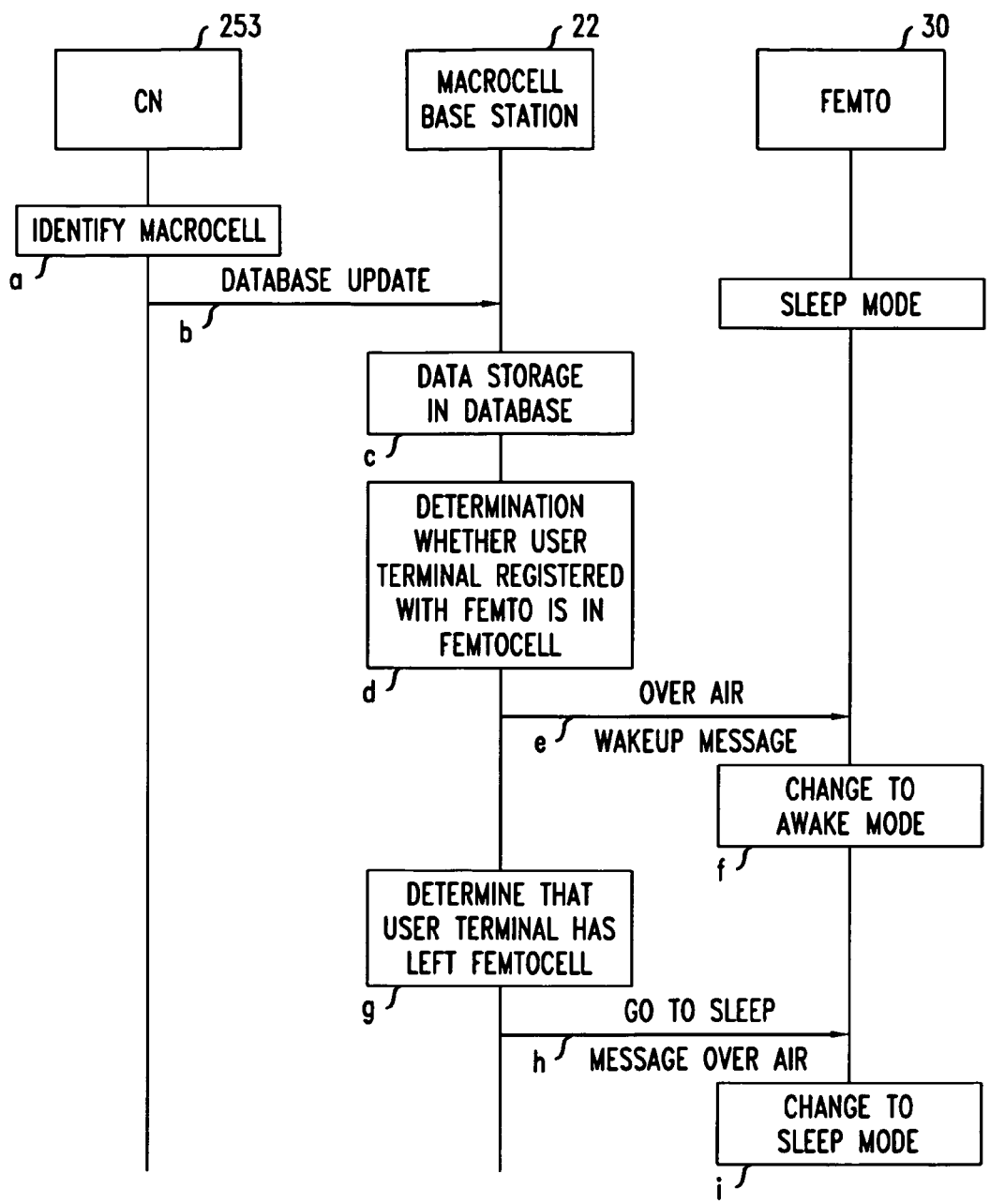

MACROCELL BASE STATION, A TELECOMMUNICATIONS NETWORK, AND A FEMTOCELL BASE STATION, AND A METHOD OF SWITCHING A FEMTOCELL BASE STATION BETWEEN A DORMANT MODE AND AN ACTIVE MODE

FIELD OF THE INVENTION

The present invention relates to telecommunications, in particular to wireless telecommunications.

DESCRIPTION OF THE RELATED ART

Wireless telecommunications systems are well-known. Many such systems are cellular, in that radio coverage is provided by a bundle of radio coverage areas known as cells. A base station that provides radio coverage is located in each cell. Traditional base stations provide coverage in relatively large geographic areas and the corresponding cells are often referred to as macrocells.

It is possible to establish smaller sized cells within a macrocell. Cells that are smaller than macrocells are sometimes referred to as small cells, microcells, picocells, or femtocells, but we use the term femtocells generically for cells that are smaller than macrocells. One way to establish a femtocell is to provide a femtocell base station that operates within a relatively limited range within the coverage area of a macrocell. One example of use of a femtocell base station is to provide wireless communication coverage within a building.

The femtocell base station is of a relatively low transmit power and hence each femtocell is of a small coverage area compared to a macrocell. A typical coverage range is tens of meters.

Femtocell base stations have auto-configuring properties so as to support plug-and-play deployment by users, for example in which femto base stations may integrate themselves into an existing macrocell network so as to connect to the core network of the macrocell network.

Femtocell base stations are intended primarily for users belonging to a particular home or office. Femtocell base stations may be private access or public access. In femtocell base stations that are private access, access is restricted only to registered users, for example family members or particular groups of employees. In femtocell base stations that are public access, other users may also use the femtocell base station, subject to certain restrictions to protect the Quality of Service received by registered users.

One known type of femtocell base station uses a broadband Internet Protocol connection as "backhaul", namely for connecting to the core network. One type of broadband Internet Protocol connection is a Digital Subscriber Line (DSL). The DSL connects a DSL transmitter-receiver ("transceiver") of the femtocell base station to the core network. The DSL allows voice calls and other services provided via the femtocell base station to be supported. The femtocell base station also includes a radio frequency (RF) transceiver connected to an antenna for radio communications. An alternative to such a wired broadband backhaul is to have a wireless backhaul.

Femtocell base stations are sometimes referred to as femtos.

In order to reduce power consumption, a power-saving mode has been introduced into base stations, including into femtos. In the power-saving mode various hardware components are switched off. The base station then makes no radio transmission and, in consequence, is not detectable by a user terminal.

SUMMARY

The reader is referred to the appended independent claims. Some preferred features are laid out in the dependent claims.

An example of the present invention is a method of switching a femtocell base station for wireless telecommunications between a dormant mode and an active mode. The femtocell base station lies within the coverage area of a macrocell base station. The macrocell base station determines whether a user terminal authorised to connect with the femtocell base station is within the coverage area of the femtocell base station, and dependent upon said determination the macrocell base station transmits over air to the femtocell base station a command for the femtocell base station to switch mode.

Preferred embodiments of the present invention provide a technique enabling wake-up of a femtocell base station by the femtocell base station's underlay macrocell base station using an over-the-air radio transmission. The transmission is preferably a broadcast on a pilot channel of the macrocell that is detected by the femtocell base station even when in dormant mode. The transmission may be a paging message to the femtocell base station that the user terminal is authorised to use. The femtocell base station responds by exiting dormant mode in the expectation of providing coverage for the user terminal.

In preferred embodiments, when the user terminal leaves the macrocell, the macrocell base station notifies the femtocell base station by over-the air radio transmission so the femtocell base station reverts to dormant mode.

Preferred embodiments allow macrocells to power up femtocells according to need, and provide distributed control as a telecommunications core network need not be involved, resulting in less control signalling.

BRIEF DESCRIPTION OF THE DRAWINGS

Embodiments of the present invention will now be described by way of example and with reference to the drawings, in which:

FIG. 5 is a message sequence diagram illustrating control of femtocell base station mode by control messaging over air from the macrocell base station within the coverage area of which the femtocell base station is situated.

DETAILED DESCRIPTION

The inventor considered that in a known approach, a cellular base station can determine whether to enter or exit a power-saving dormant mode in response to the location of a user terminal provided the user terminal that is in the coverage area of the base station is in active mode. This is because the cellular network, specifically the base station or the core network to which the base station is attached, can detect the user terminal when the user terminal is in a call session.

The inventors realised that, conversely, in the known approach when the user terminal is in idle mode, the user terminal does not send information back to the network about its location unless the user terminal moves from one paging area (called a Location Area in this Universal Mobile Telecommunications System, UMTS, example) to another. As a Location Area typically covers a large area and hence a large number of cells, the inventors realised that, in this known approach, a base station in power-saving mode will not know if the user terminal in idle mode entered its coverage area. In other words, in the known approach, activation of a base station to bring it out of power-saving mode can only be done when the user terminal is in active mode.

Figure 1:
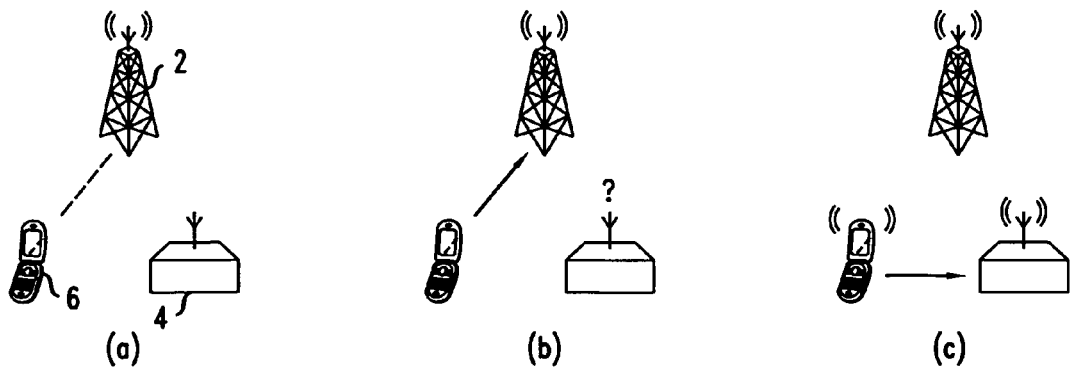
FIG. 1 is diagram illustrating a known femto wake up procedure (PRIOR ART)

The inventors then considered an alternative proposal as shown in FIG. 1. As shown in FIG. 1, there is a macrocell base station 2 that is always switched-on, a femto 4 and a user terminal 6. As shown in the Figure, at a first point in time (a) the user terminal is in idle mode and camped on the macrocell (in other words idle-mode connected to the macrocell base station). The femto is then in dormant mode.

Subsequently, the user terminal goes into active mode and makes an active connection to the macrocell. This makes the user terminal detectable by the femto. For example at time (b) the user terminal is active and starts transmitting via a call connection with the macrocell. The user terminal is then detectable by the femto as the femto has a sniffer receiver, namely a signal detector operating in the macrocell's frequency band.

The femto's detection of the user terminal triggers the femto to power on, in other words wake up from the power-saving sleep mode into awake mode. After this the call connection between the user terminal and macrocell base station is transferred to being between the user terminal and femto. Specifically, for example at time (c) as shown in FIG. 1, the femto starts transmission of pilot signals that are detected by the user terminal. The call is then handed over from the macrocell base station to the femto. The inventor realised that this alternative proposal introduces additional signalling to the network in view of having to hand over the user terminal from the macrocell base station to the femto, and requires the user terminal to come into active mode.

The inventor then considered examples of the present invention as explained below, at least some of which do not require that the user terminal is in active mode.

We now turn to describing in detail an example embodiment of the invention, firstly describing a network including femtocell base stations then looking in detail at control of the femtos by macrocells over air.

Network

Figure 2:
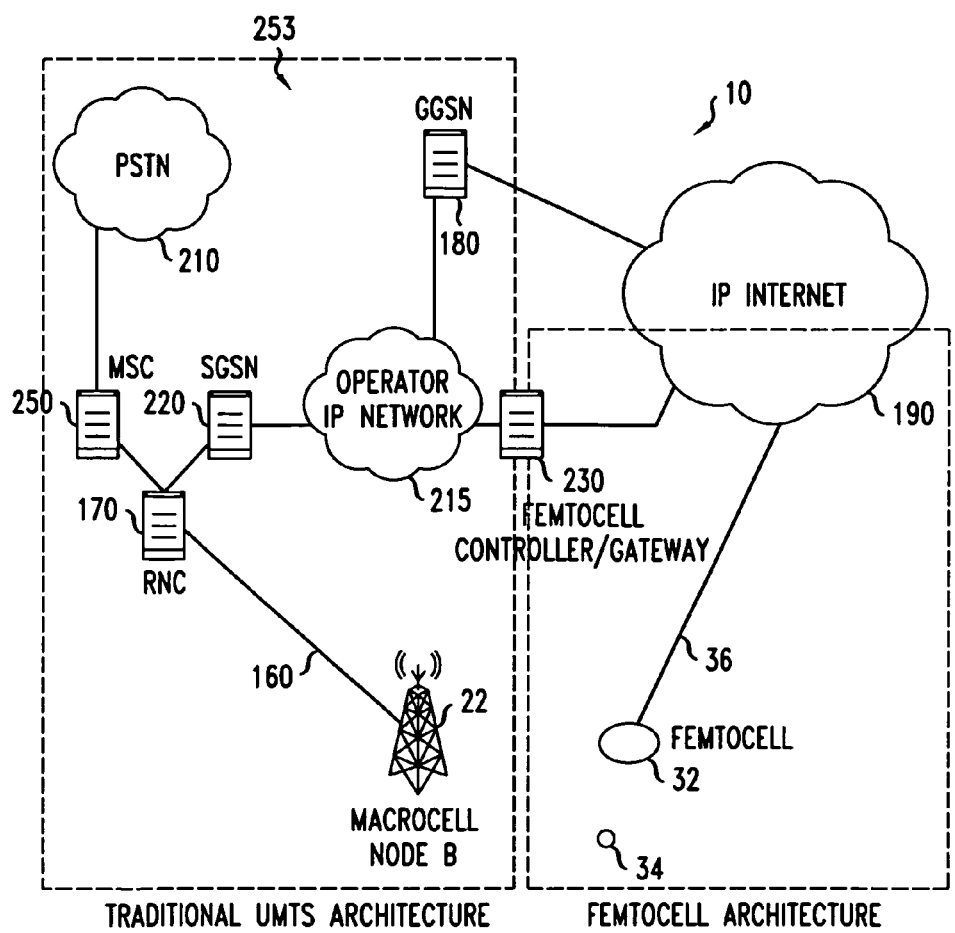
FIG. 2 is a diagram illustrating a wireless communications network according to a first embodiment of the present invention.
Figure 3:
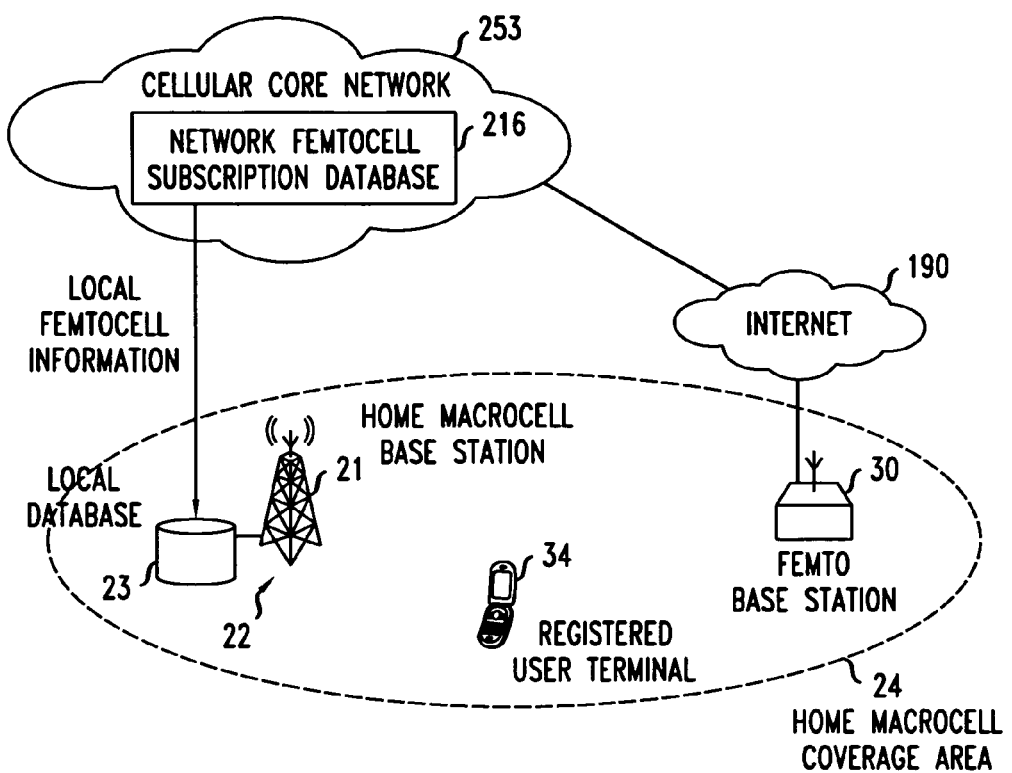
FIG. 3 is a diagram illustrating an example femtocell base station deployment within one macrocell shown in FIG. 1.

As shown in FIGS. 2 and 3, a network 10 for wireless communications, through which a user terminal 34 may roam, includes two types of base station, namely macrocell base stations and femtocell base stations (the latter being sometimes called "femtos"). One macrocell base station 22 is shown in FIGS. 2 and 3 for simplicity. Each macrocell base station has a radio coverage area 24 that is often referred to as a macrocell. The geographic extent of the macrocell 24 depends on the capabilities of the macrocell base station 22 and the surrounding geography.

Within the macrocell 24, each femtocell base station 30 provides wireless communications within a corresponding femtocell 32. A femtocell is a radio coverage area. The radio coverage area of the femtocell 32 is much less than that of the macrocell 24. For example, the femtocell 32 corresponds in size to a user's office or home.

As shown in FIG. 2, the network 10 is managed by a radio network controller, RNC, 170. The radio network controller, RNC, 170 controls the operation, for example by communicating with macrocell base stations 22 via a backhaul communications link 160. The radio network controller 170 maintains a neighbour list which includes information about the geographical relationship between cells supported by base stations. In addition, the radio network controller 170 maintains location information which provides information on the location of the user equipment within the wireless communications system 10. The radio network controller 170 is operable to route traffic via circuit-switched and packet-switched networks. For circuit-switched traffic, a mobile switching centre 250 is provided with which the radio network controller 170 may communicate. The mobile switching centre 250 communicates with a circuit-switched network, in particular a public switched telephone network (PSTN) 210. For packet-switched traffic, the network controller 170 communicates with serving general packet radio service support nodes (SGSNs) 220 and a gateway general packet radio support node (GGSN) 180. The GGSN then communicates with a packet-switch core such as, for example, the Internet 190.

The MSC 250, SGSN 220, GGSN 180 and operator IP network 215 constitute a so-called core network 253. The SGSN 220 and GGSN 180 are connected by an operator IP network 215 to a femtocell controller/gateway 230.

The femtocell controller/gateway 230 is connected via the Internet 190 to the femtocell base stations 32. These connections to the femtocell controller/gateway 230 are broadband Internet Protocol connections ("backhaul") connections.

It is possible for a mobile terminal 34 within the macrocell 24 to communicate with the macrocell base station 22 in known manner. When the mobile terminal 34 enters into a femtocell 32 for which the mobile terminal is registered for communications within the femtocell base station 30, it is desirable to handover the connection with the mobile terminal from the macrocell to the femtocell.

As shown in FIG. 3, the femtocell base station 34 is within the macrocell coverage area so the macrocell base stations 22 may be considered the "home" macrocell base station for the femto. The macrocell base station 22 includes an antenna tower 21 and a local database 23. The local database 23 contains information about all the femtos that are located within the macrocell coverage area 24.

As shown in FIG. 3, the core network 253 includes a network femtocell subscription database 216. In this example, more specifically, the network femtocell subscription database 216 is located in the operator IP network 215. This database 216 contains information provided by the owner of the femto when the femtos is purchased, registered and deployed. The information includes an identifier of the location where the femto is deployed, for example the femto owner's address. The information also includes a list of the user terminals registered with the femto and so authorised to connect to the femto.

Figure 4:
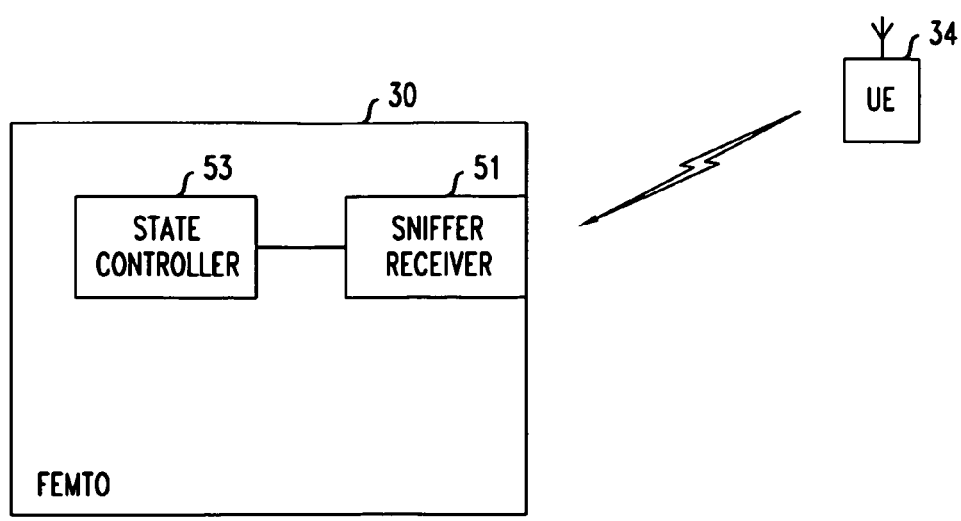
FIG. 4 is a diagram illustrating an example femtocell base station in more detail.

As shown in FIG. 4, the femto 30 includes a "sniffer" radio receiver 51 which even in sleep mode is active to receive broadcast(s) from the macrocell base station. The sniffer receiver 51 is connected to a processor, namely a mode controller 53, which is operative to activate/deactivate certain other components (not specifically shown) of the femto dependent on whether asleep mode or active mode is selected.

Wake-Up Broadcast by a Macrocell Base Station

In the example, over-air macrocell-initiated wake-up of femtos is enabled.

As shown in FIG. 5, upon a femto 30 being deployed, the core network 253 determines (step a) in which macrocell the femto resides using the information identifying the location of the femto (namely the femto owner's address in this example) that was stored in the subscription database 216. The core network then sends (step b) information of the femto's registered user terminals to the macrocell base station 22. The macrocell base station 22 stores (step c) this information in the local database 23 of the macrocell base station 22. In this way, the macrocell base station 22 maintains a record of the identities of all femtos residing within the macrocell 24 and, for each of these femtos, the identities of their respective registered user terminals.

The femto 30 is initially in sleep mode, in which many internal components are powered down, but, as previously mentioned, the "sniffer" receiver 51 remains active to receive and decode transmission from the macrocell. In sleep mode, the femto does not send pilot signal transmissions.

Upon a user terminal 34 entering the macrocell 24, the macrocell base station 22 detects the user terminal, and checks (step d) its local database 23 to determine whether the user terminal is a registered user terminal of any of the femtos residing within the macrocell 24. Upon the user terminal being so identified, the macrocell base station 24 sends (step e) an instruction message by radio over air to the femto with which the user terminal is registered. The instruction message is an instruction for the femto to wake up, in other words switch to active mode so as to be ready to serve the user terminal. The instruction message is in the form of a direct radio connection, initiated and controlled by the macrocell base station. Specifically the instruction message is a paging message sent over a pilot channel of the macrocell that is monitored by the sniffer receiver of the femtocell base station.

The femto reacts by switching (step f) to active mode by powering up the powered-down components and making pilot signal transmissions so as to be ready to connect to, and serve, the user terminal.

At a later time, upon determining (step g) that a user terminal has left the coverage area of the macrocell, the macrocell base station sends (step h) an instruction message over air to the femto instructing the femto to enter sleep mode. The femto responds by entering (step i) sleep mode.

In this example, the macrocell base station 22 automatically knows when a user terminal is in its coverage area when the user terminal is in active mode, in other words connected in a call or data session. However, when the user terminal is switched on but in idle mode another technique is used to detect the presence of the user terminal. For example the user terminal performs a Mobility procedure when the user terminal moves into the paging area (called a Location Area in this Universal Mobile Telecommunications System (UMTS) example) of the macrocell base station 22.

Some Variants

In an otherwise similar embodiment, the shift to active mode of the femto is instructed by the core network. This can be considered a core-network initiated power-up of the femto. The cellular network, in particular the operator's IP network which including the network femtocell subscription database, has good information as the user terminal's location and uses this to select the appropriate femto to power-up. The command to switch to active mode is sent to the femto over air direct from the macrocell base station in the coverage area of which the femto resides.

In an otherwise similar embodiment, the macrocell sends a command over air for a femto to switch to sleep mode upon determining that that femto is causing excessive interference, and sends a command that the femto switch to active mode in order to perform load balancing when the macrocell is congested.

General

The present invention may be embodied in other specific forms without departing from its essential characteristics. For example, other embodiments relate to other networks where a base station has a larger coverage area and so overlays base stations that have smaller coverage areas, such as so-called small cell deployments. Other embodiments are applicable to various cellular technologies, such as Long Term Evolution (LTE), WiMAX etc.

The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. Some embodiments involve computers programmed to perform said steps of the above-described methods.

The invention claimed is:

1. A method of controlling a femtocell base station for wireless telecommunications, comprising:
   determining a user terminal authorised to connect with a femtocell base station entered a coverage area of a macrocell base station, wherein the femtocell base station is located within the coverage area of the macrocell base station; and
   transmitting a command to the femtocell base station that causes the femtocell base station to switch from a dormant mode to an active mode based at least in part on the determination;
   wherein the macrocell base station performs said determination and transmits the command over air to the femtocell base station.

2. The method according to claim 1, wherein, in the dormant mode, the femtocell base station does not make pilot signal transmissions and, in the active mode, the femtocell base station does make pilot signal transmissions.

3. The method according to claim 1, wherein the femtocell base station comprises a radio receiver configured to receive the command whilst the femtocell base station is in the dormant mode.

4. The method according to claim 1, wherein the macrocell base station transmits the command to the femtocell base station after determining the user terminal is within the coverage area of the femtocell base station.

5. The method according to claim 4, further comprising:
   transmitting a further command from the macrocell base station to the femtocell base station over air after determining the user terminal is no longer within the coverage area of the femtocell base station.

6. The method according to claim 5, wherein the further command causes the femtocell base station to switch from the active mode to the dormant mode.

7. The method according to claim 1, further comprising:
   transmitting a further command from the macrocell base station to the femtocell base station over air after determining the user terminal is no longer within the coverage area of the macrocell base station.

8. The method according to claim 7, wherein the further command causes the femtocell base station to switch from the active mode to the dormant mode.

9. The method according to claim 1, further comprising:
determining the user terminal is authorised to connect with the femtocell base station by inspecting a list of identities of user terminals authorised to connect with the femtocell base station and finding the user terminal identified in the list of identities of user terminals.

10. The method according to claim 9, wherein the list of identities of user terminals is provided to the macrocell base station by a core network via a telecommunications network, wherein the macrocell base station stores the list of identities of user terminals in a memory.

11. A network element for wireless telecommunications configured to:
determine a user terminal authorised to connect with a femtocell base station entered a coverage area of a macrocell base station where the femtocell base station is located within the coverage area of the macrocell base station; and
transmit a command to the femtocell base station that causes the femtocell base station to switch from a dormant mode to an active mode based at least in part on the determination;
wherein the network element is a macrocell base station, the macrocell base station being configured to perform the determination and transmit the command over air to the femtocell base station.

12. The network element according to claim 11, wherein the macrocell base station is configured to transmit the command to the femtocell base station after determining the user terminal is within the coverage area of the femtocell base station.

13. The network element according to claim 12, wherein the macrocell base station is configured to transmit a further command to the femtocell base station over air after determining the user terminal is no longer within the coverage area of the femtocell base station.

14. The network element according to claim 13, wherein the further command causes the femtocell base station to switch from the active mode to the dormant mode.

15. The network element according to claim 11, wherein the macrocell base station is configured to transmit a further command to the femtocell base station over air after determining the user terminal is no longer within the coverage area of the macrocell base station.

16. The network element according to claim 15, wherein the further command causes the femtocell base station to switch from the active mode to the dormant mode.

17. The network element according to claim 11, wherein the macrocell base station is configured to determine the user terminal is authorised to connect with the femtocell base station by inspecting a list of identities of user terminals authorised to connect with the femtocell base station and finding the user terminal identified in the list of identities of user terminals.

18. A wireless telecommunications network for wireless telecommunications, comprising:
a macrocell base station configured to determine a user terminal entered a coverage area of a macrocell base station where the femtocell base station is located within the coverage area of the macrocell base station, wherein the macrocell base station is configured to determine the user terminal is authorised to connect with the femtocell base station by inspecting a list of identities of user terminals authorised to connect with the femtocell base station and finding the user terminal identified in the list of identities of user terminals, wherein the macrocell base station is configured to transmit a command over air to the femtocell base station that causes the femtocell base station to switch from a dormant mode to an active mode based at least in part on the determinations; and
a core network connected to the macrocell base station, wherein the core network is configured to provide the list of identities of user terminals to the macrocell base station;
wherein the macrocell base station is configured to store the list of identities of user terminals in a memory.

19. The wireless telecommunications network according to claim 18, wherein the macrocell base station is configured to transmit the command to the femtocell base station after determining the user terminal is within the coverage area of the femtocell base station.

20. The network element according to claim 18, wherein the macrocell base station is configured to transmit a further command to the femtocell base station over air after determining the user terminal is no longer within the coverage area of the macrocell base station.

* * * * *